(12) United States Patent
Horiba et al.

(10) Patent No.: US 7,664,318 B2
(45) Date of Patent: Feb. 16, 2010

(54) FIGURE READING APPARATUS, METHOD AND PROGRAM

(75) Inventors: Yuji Horiba, Nissin (JP); Masanori Kondo, Nissin (JP)

(73) Assignee: NEC Software Chubu, Ltd., Nissin-Shi (JP)

( * ) Notice: Subject to any disclaimer, the term of this patent is extended or adjusted under 35 U.S.C. 154(b) by 737 days.

(21) Appl. No.: 10/588,076

(22) PCT Filed: Sep. 16, 2005

(86) PCT No.: PCT/JP2005/017134
§ 371 (c)(1),
(2), (4) Date: Jul. 31, 2006

(87) PCT Pub. No.: WO2006/030891
PCT Pub. Date: Mar. 23, 2006

(65) Prior Publication Data
US 2007/0165944 A1  Jul. 19, 2007

(30) Foreign Application Priority Data
Sep. 17, 2004  (JP) .............................. 2004-271764

(51) Int. Cl.
*G06K 9/00* (2006.01)
(52) U.S. Cl. ...................................... 382/165; 382/190
(58) Field of Classification Search .................. 382/162, 382/165, 168, 170, 181, 190, 225, 284
See application file for complete search history.

(56) References Cited

U.S. PATENT DOCUMENTS

| | | | | | |
|---|---|---|---|---|---|
| 4,998,286 | A | * | 3/1991 | Tsujiuchi et al. | 382/165 |
| 5,459,797 | A | * | 10/1995 | Sato | 382/165 |
| 6,711,287 | B1 | * | 3/2004 | Iwasaki | 382/165 |

FOREIGN PATENT DOCUMENTS

| | | |
|---|---|---|
| JP | 2649367 | 5/1997 |
| JP | 10-289242 | 10/1998 |
| JP | 2003-16444 | 1/2003 |
| JP | 2003-259143 | 9/2003 |
| JP | 2003-337945 | 11/2003 |
| JP | 2005-309819 | 11/2005 |

\* cited by examiner

*Primary Examiner*—Phuoc Tran
(74) *Attorney, Agent, or Firm*—Young & Thompson

(57) ABSTRACT

A figure reading apparatus capable of increasing the processing rate while maintaining the recognition precision, includes an image input apparatus for inputting a color image and a data processing apparatus for conducting processing on the input color image. The figure reading apparatus has a main color extraction function of extracting main colors contained in the color image and resolving the color image into main color images respectively of the main colors extracted from the input color image, a projection function of projecting points of extracted main colors on a three-dimensional space onto a plane by using a conversion expression, a candidate narrowing down function of removing combinations that need not be combined according to features of distance between main colors projected onto a two-dimensional space, and a combination generation function of combining images from candidates narrowed down and generating an image area candidate.

11 Claims, 5 Drawing Sheets

FIGURE READING APPARATUS, METHOD AND PROGRAM

TECHNICAL FIELD

The present invention relates to a figure reading apparatus which conducts pattern recognition on characters or the like represented by a color image.

BACKGROUND ART

There is a conventional technique of recognizing figures such as characters represented by a color image without being affected by the illumination condition or the like. In this technique, it is made possible to recognize a subject figure with high precision by using combinations of main color components of the subject figure in order to cope with separation caused in a figure area of a recognition subject by an influence of, for example, a shadow depending upon the illumination condition or a coated surface thinned by deterioration or the like condition.

FIG. 1 shows an example of a system for removing the influence of the illumination condition or the like in the conventional figure reading. The conventional figure reading system includes image input means, main color extraction means, combination generation means, figure area extraction means and figure recognition means.

The conventional system having such a configuration operates as described hereafter. With respect to a color image input from the image input unit, the main color extraction means extracts main colors on the basis of a local peak value in a color histogram included in the color image, and resolves the color image into main color images respectively of the extracted main colors. The combination generation means combines the main color images generated by the resolving and generates combined images. The figure area extraction means extracts character area candidates from the main color images and the combined images. The figure recognition means conducts character recognition processing on all extracted character area candidates, and obtains the best character reading result on the basis of character recognition frequencies in a result of the character recognition processing.

Furthermore, there is a pattern recognition apparatus for selecting a main color having a distance from a main color which is a certain threshold or less from among the main colors in the RGB color space in the pattern recognition of characters or the like indicated in a color image (see, for example, Patent Document 1).

Patent Document 1: JP 2003-16444A

DISCLOSURE OF THE INVENTION

Problem to be Solved by the Invention

In the conventional technique, however, all combinations of the main color components extracted from the subject figure are used. Accordingly, there is a problem that the processing time increases remarkably as the main colors increase.

In other words, when generating combined images, effective combinations cannot be determined. In the subsequent figure area extraction means and figure recognition means, therefore, it is necessary to conduct processing on extra candidates as well. Accordingly, the general processing rate cannot be increased.

Therefore, an object of the present invention is to provide a figure reading apparatus, method and program capable of increasing the processing rate remarkably while maintaining the recognition precision in figure recognition or the like using a color image.

Means for Solving the Problem

In order to achieve the object, the present invention provides a figure reading apparatus for reading, recognizing and outputting a figure, the figure reading apparatus including image input means for inputting a color image, main color extraction means for extracting main colors contained in the color image and resolving the color image into main color images respectively of main colors extracted from the input color image, projection means for projecting points of extracted main colors on a three-dimensional space onto a plane by using a conversion expression, candidate narrowing down means for removing combinations that need not be combined according to features of distance between main colors projected onto a two-dimensional space, and combination generation means for combining images from candidates narrowed down and generating an image area candidate.

Owing to the configuration above described, extra candidates are not generated, but improvement of the processing speed as a whole can be anticipated. Furthermore, it is possible to eliminate invalid combinations when removing the influence of the illumination condition or the like.

EFFECT OF THE INVENTION

A first effect of the present invention is that effective extraction of candidate areas becomes possible in figure recognition processing affected by the illumination condition or the coated surface thinned by deterioration or the like condition.

A second effect is that the processing rate can be made high while maintaining the precision of the whole processing, by conducting effective extraction of candidate areas.

DESCRIPTION OF REFERENCE NUMERALS

10: Image input apparatus
20: Data processing apparatus

BEST MODE FOR CARRYING OUT THE INVENTION

The best mode for carrying out the present invention will now be described with reference to the drawings.

First Embodiment

Figure 1:
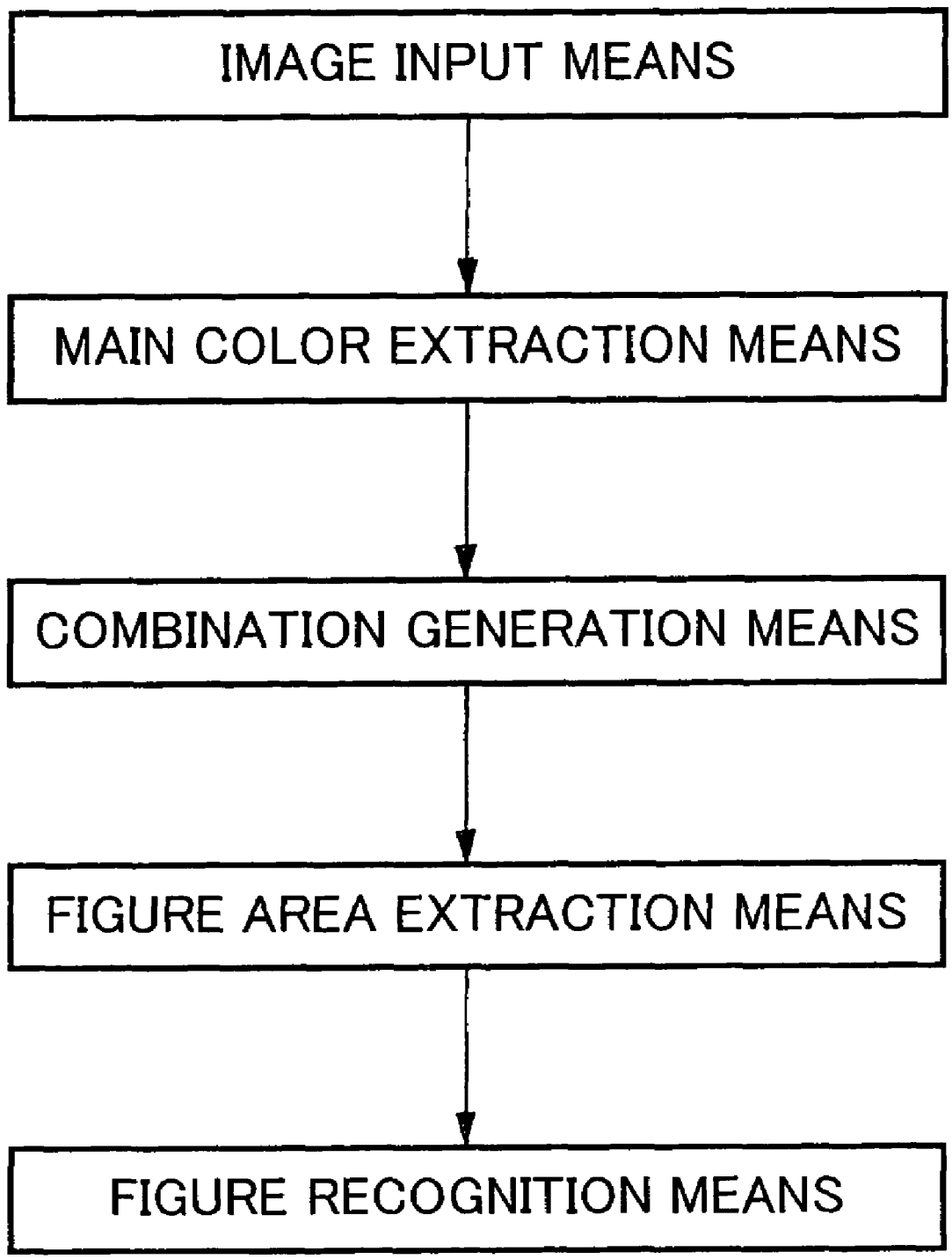
FIG. 1 is a diagram showing an example of a conventional figure reading system.
Figure 2:
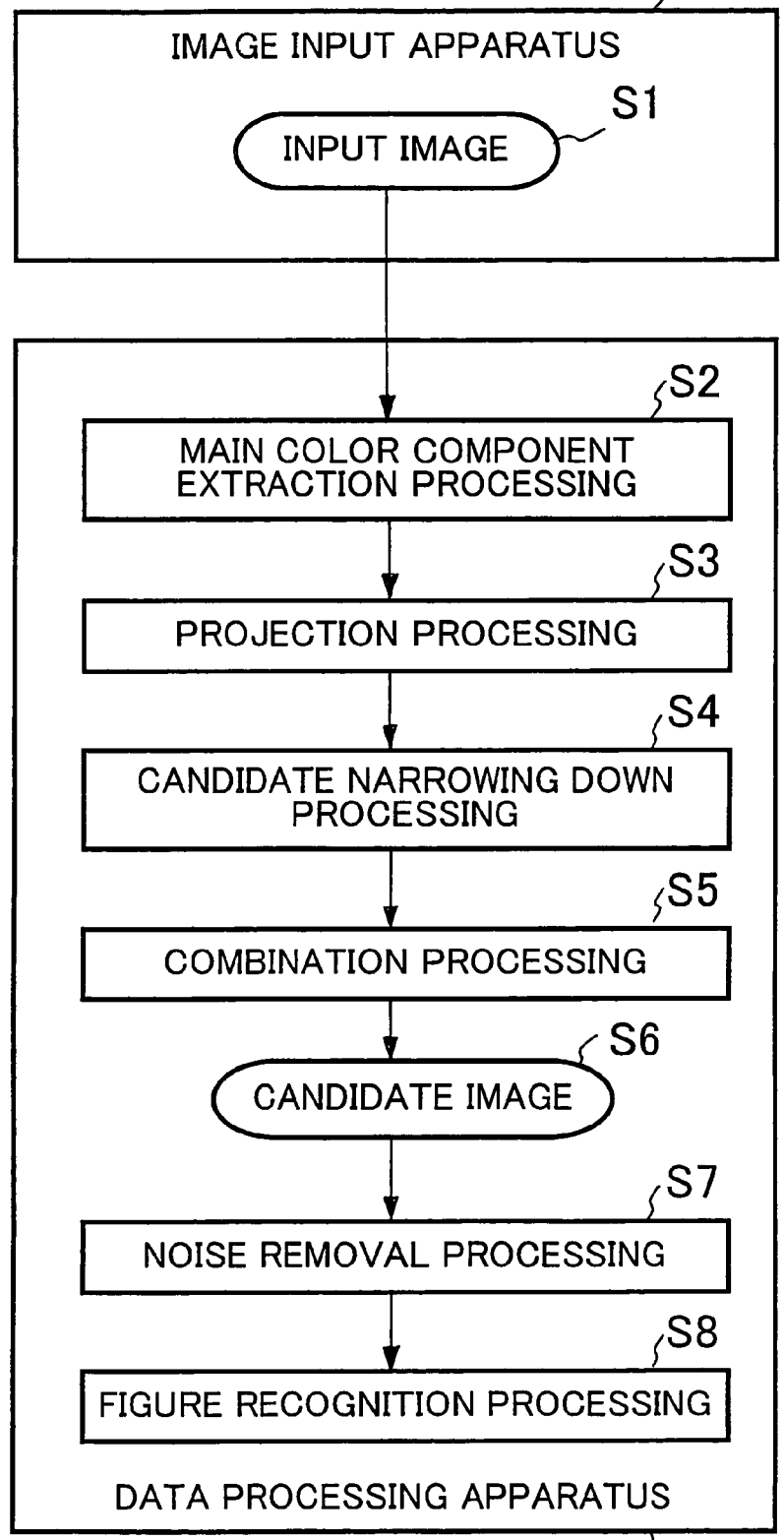
FIG. 2 is a diagram showing a schematic configuration of a figure reading apparatus according to the present invention and its processing procedure.

FIG. 2 shows a schematic configuration of a figure reading apparatus according to the present invention and its processing procedure. The present embodiment includes an image input apparatus 10 such as a digital camera or a scanner capable of acquiring a color image, and a data processing apparatus (computer) 20 capable of conducting processing on the color image input from the image input apparatus 10 under program control.

Figure 3:
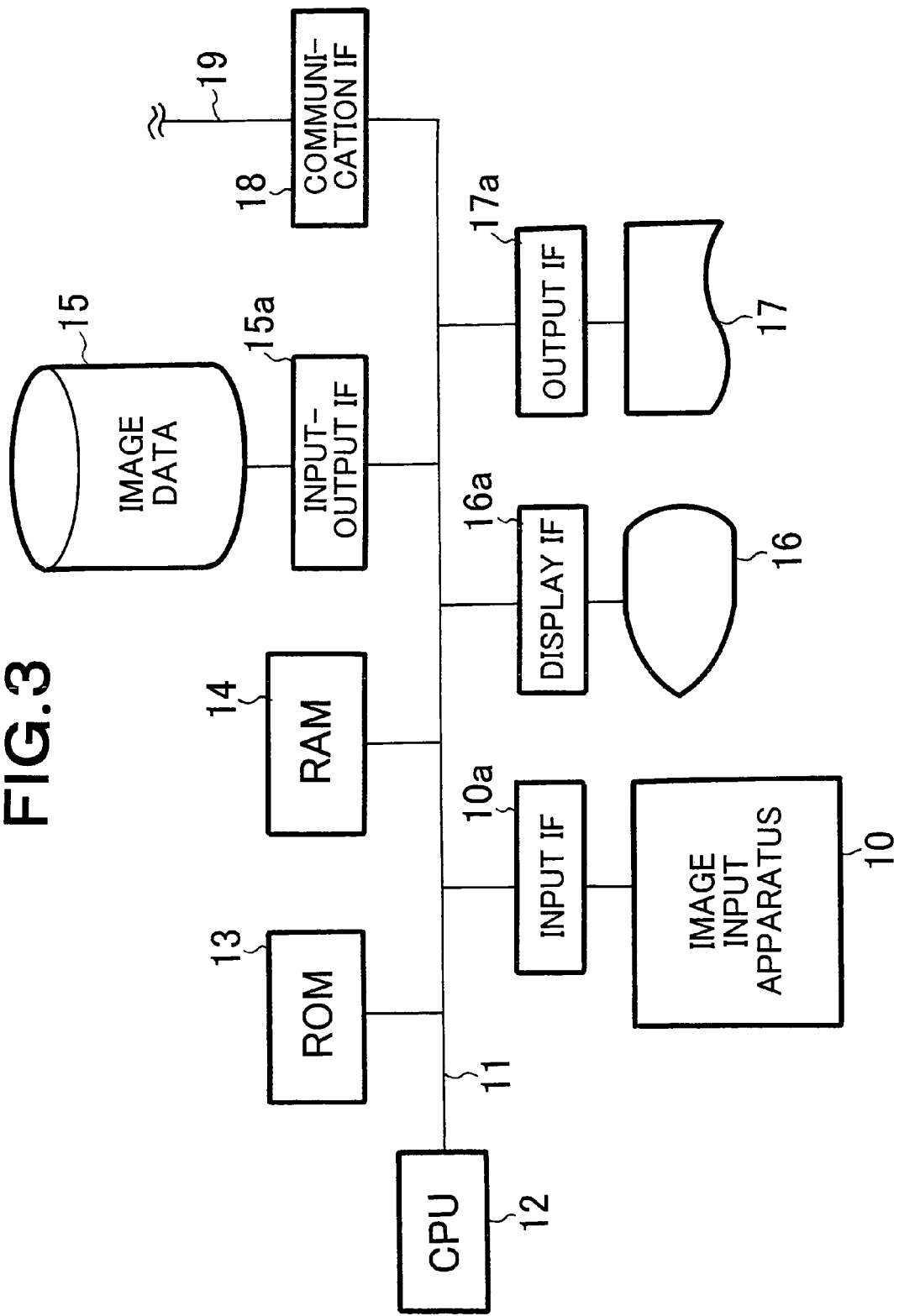
FIG. 3 is a diagram showing a schematic hardware configuration of a figure reading apparatus.

FIG. 3 shows a schematic hardware configuration of the figure reading apparatus. In the data processing apparatus 20, a CPU 12, a ROM 13 and a RAM 14 are connected to a system bus 11. In addition, a magnetic disk apparatus 15 is connected to the system bus 11 via an input-output interface 15a. A cache memory is mounted on the CPU 12, and the CPU 12 conducts instruction execution and arithmetic operation processing. A BIOS (basic input/output system) and so on are stored in the ROM 13 as firmware. The RAM 14 is a main storage, and the RAM 14 stores a program and data read out from the magnetic disk apparatus 15. An operating system, an application program and so on are stored in the magnetic disk apparatus 15. A program, image data and so on for executing the present invention are also stored in the magnetic disk apparatus 15.

An image input apparatus 10, a display 16 and a printer 17 are connected to the system bus 11 via an input interface 10a, a display interface 16a and a output interface 17a, respectively. In addition, the system bus 11 is connected to a network 19 via a communication interface 18 to conduct data transmission and reception with a different server or terminal.

The data processing apparatus 20 functions as main color component extraction means, projection means, candidate narrowing means and combined image generation means by using a control program. Operations of these means will now be described in brief.

The main color component extraction means extracts main color components from a color image. The projection means presumes a direction in which color components in an area separated according to the sunshine conditions or the like are separated on the three-dimensional space of colors, and generates a projection image of each color component on a plane perpendicular to an approximate separation direction. For example, the RGB space is supposed. Under the influence of the sunshine conditions, there is a feature that a shift is conducted in the approximate direction of a vector (R, G, B)=(1, 1, 1). Therefore, a projection image of color components projected onto a plane of R+G+B=0 from the direction of (R, G, B)=(1, 1, 1) is found. The candidate narrowing down means compares points of the projected color components, and narrows down candidate combinations by using a threshold found by experiments beforehand. The combined image generation means determines main colors, and generates a combined image from candidates narrowed down.

Figure 4:
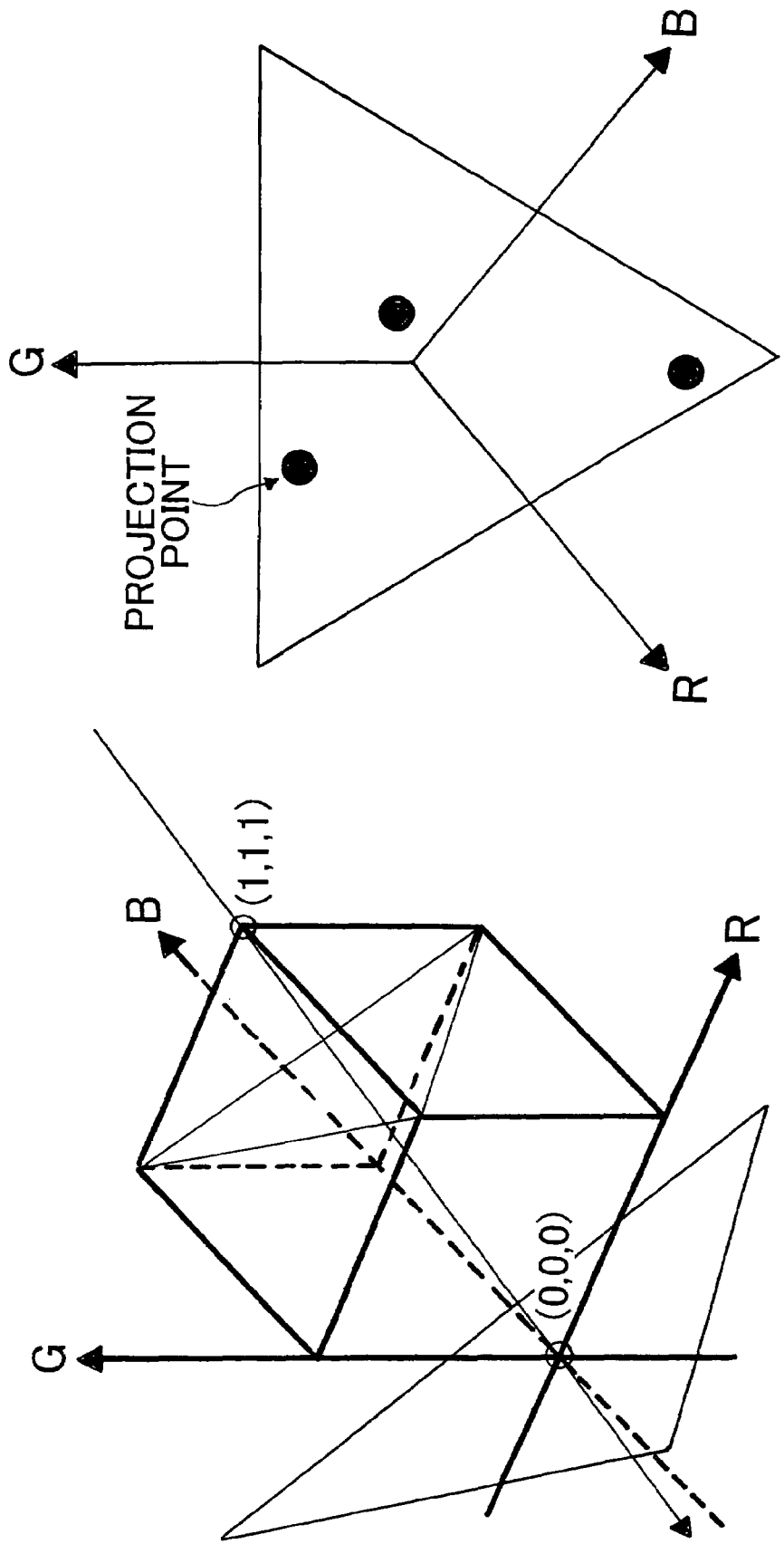
FIG. 4 is a diagram showing projection from a three-dimensional space of colors onto a plane.

Operation in the present embodiment will now be described with reference to the flow chart shown in FIG. 2. First, an image input from the image input apparatus 10 is input to the data processing apparatus 20 as a color image (step S1). With respect to the input color image, the main color component extraction means in the data processing apparatus 20 extracts main colors on the basis of a local peak value in a color histogram contained in color information, and resolves the color image into main color images respectively of the extracted main colors (step S2). Subsequently, points of the main colors on the three-dimensional space extracted at the step S2 are projected onto the plane of R+G+B=0 from the direction of (R, G, B)=(1, 1, 1) as shown in FIG. 4 by using the following conversion expression (step S3).

$$(x\ y\ z\ 1) = (x'\ y'\ z'\ 1) \begin{pmatrix} \cos(-\frac{\pi}{4}) & 0 & -\sin(-\frac{\pi}{4}) & 0 \\ 0 & 1 & 0 & 0 \\ \sin(-\frac{\pi}{4}) & 0 & \cos(-\frac{\pi}{4}) & 0 \\ 0 & 0 & 0 & 1 \end{pmatrix} \begin{pmatrix} 1 & 0 & 0 & 0 \\ 0 & \cos\theta_1 & \sin\theta_1 & 0 \\ 0 & -\sin\theta_1 & \cos\theta_1 & 0 \\ 0 & 0 & 0 & 1 \end{pmatrix}$$ [Equation 1]

$$\cos\theta_1 = \frac{\sqrt{2}}{\sqrt{3}},\ \sin\theta_1 = \frac{1}{\sqrt{3}}$$

In the expression, (x' y' z' 1) on the right side represents coordinates before conversion, and (x y z 1) on the left side represents coordinates after conversion.

In addition, distances between points of the main colors on the projection plane found at the step S3 are compared. If the distance is within a threshold range found by experiments beforehand, then the combination of the main colors is regarded as valid. If the distance is outside the threshold range, then the combination is regarded as invalid (step S4). As a result, an image area candidate combination is determined (steps S5 and S6). Subsequently, noise removal processing for removing portions other than the extraction target is conducted on the determined image area (step S7). Finally, the target subject is recognized by conducting figure recognition processing (step S8).

Effects brought by the first embodiment will now be described. In the present embodiment, it becomes possible to remove meaningless extra combinations when determining a combined image, and combine only effective areas such as character areas separated under the influence of the illumination condition or the coated surface thinned by deterioration or the like condition. As a result, it becomes possible to decrease the number of candidate areas. In the subsequent noise removal processing and recognition processing, therefore, it can be anticipated to increase the processing rate while maintaining the recognition precision.

Furthermore, since meaningless extra combinations are removed in the present embodiment, finally extra results are not output. Therefore, the present embodiment is effective in selection processing of final results as well.

Second Embodiment

A second embodiment of the present invention will now be described. A schematic configuration of a figure reading apparatus according to the present embodiment and a processing procedure in the apparatus are the same as those in the first embodiment shown in FIG. 2.

The present embodiment differs from the first embodiment in the projection function of the projection means. First, the main color component extraction means extracts main color components from a color image. Even if a subject image is exposed to light from a specific light source, the projection means generates a projection image on a plane perpendicular to a direction indicated by a color of the light source from the direction. The candidate narrowing down means compares points of the projected color components, and narrows down candidate combinations by using a threshold found by experiments beforehand. The combined image generation means determines main colors, and generates combined images from candidates narrowed down.

Operation in the present embodiment will now be described with reference to the flow chart shown in FIG. 2.

First, an image input from the image input apparatus 10 is input to the data processing apparatus 20 as a color image (step S1). With respect to the input color image, the main color component extraction means in the data processing apparatus 20 extracts main colors on the basis of a local peak value in a color histogram contained in color information, and resolves the color image into main color images respectively of the extracted main colors (step S2).

Subsequently, points of the main colors on the three-dimensional space extracted at the step S2 are projected onto a plane. As for a subject affected by a specific light source such as a color light source, however, it is considered that color information is also changed in a specific direction other than the direction of (R, G, B)=(1, 1, 1) according to a feature of the light source. A projection plane (perpendicular to the change direction) is found on the basis of a feature of the change, and projection onto the plane is conducted (step S3). In addition, distances between points of the main colors on the projection plane found at the step S3 are compared. If the distance is within a threshold range found by experiments beforehand, then the combination of the main colors is regarded as valid. If the distance is outside the threshold range, then the combination is regarded as invalid (step S4). As a result, an image area candidate combination is determined (steps S5 and S6). Subsequently, noise removal processing for removing portions other than the extraction target is conducted on the determined image area (step S7). Finally, the target subject is recognized by conducting figure recognition processing (step S8).

In the present embodiment, a projection image of a subject affected by a specific light source such as a color light source can be generated onto a plane perpendicular to a direction indicated by a color of the light source from the direction.

Third Embodiment

Figure 5:
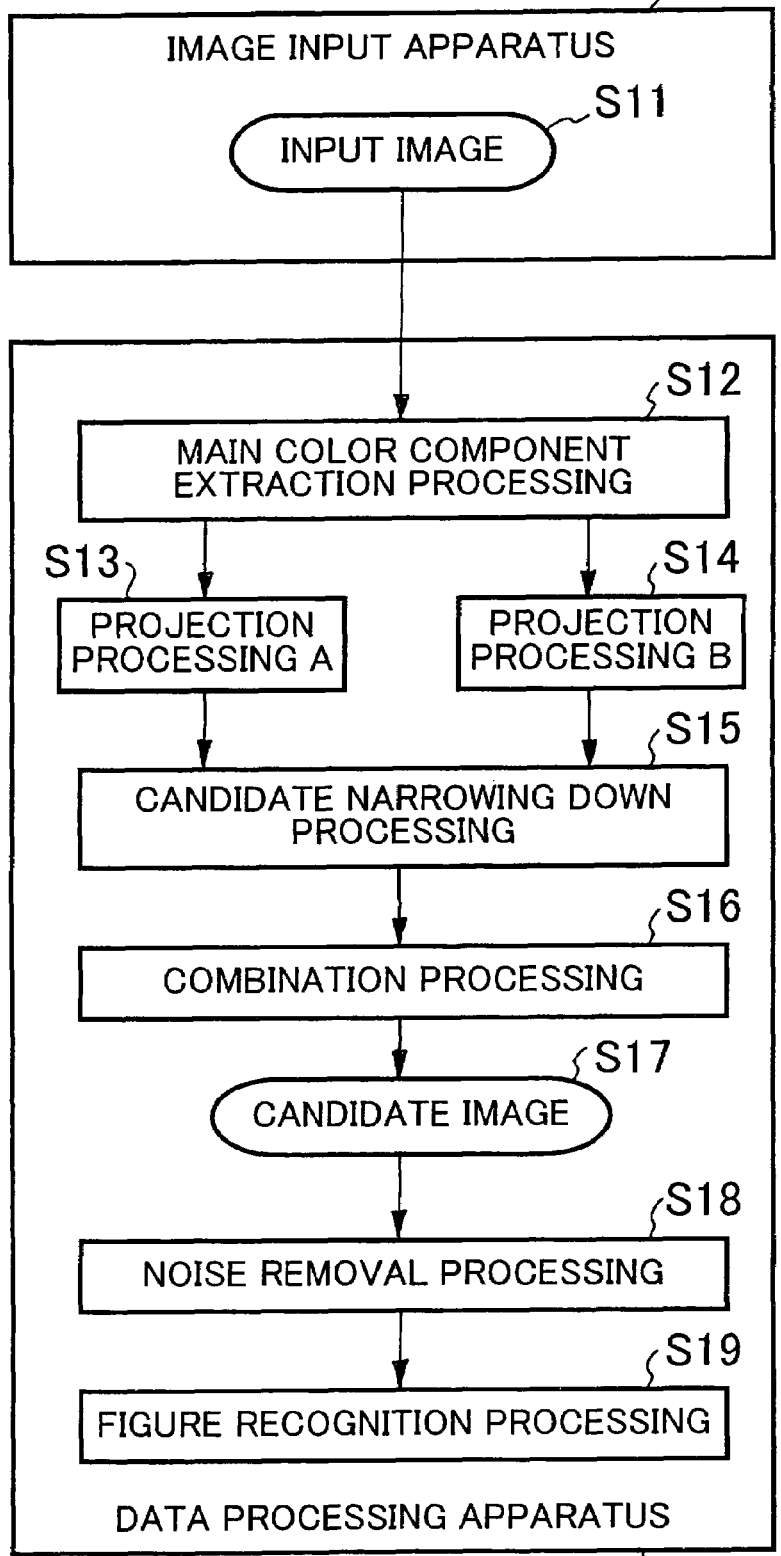
FIG. 5 is a diagram showing a schematic configuration of a figure reading apparatus according to a third embodiment and its processing procedure.

A third embodiment of the present invention will now be described. In the present embodiment, the projection means in the first embodiment and the projection means in the second embodiment can be selected and executed. FIG. 5 shows a schematic configuration of a figure reading apparatus according to the present embodiment and a processing procedure in the apparatus.

The data processing apparatus 20 functions as main color component extraction means, projection means A (the projection means according to the first embodiment) or projection means B (the projection means according to the second embodiment), candidate narrowing means and combined image generation means by using a control program. In the present embodiment, a candidate area is generated by conducting combination using distances between points of main color components projected using the projection means A or the projection means B.

First, main color component extraction means extracts main color components from a color image. Using a threshold found beforehand using experiments, a decision is made as to distances between main color components projected from a three-dimensional space onto a two-dimensional space by the projection means A or the projection means B. Narrowing down is conducted. Combined images (two combinations, three combinations, and n combinations) of a plurality of patterns of main color components are generated.

Operation in the present embodiment will now be described with reference to the flow chart shown in FIG. 5. First, an image input from the image input apparatus 10 is input to the data processing apparatus 20 as a color image (step S11). With respect to the input color image, the main color component extraction means in the data processing apparatus 20 extracts main colors on the basis of a local peak value in a color histogram contained in color information, and resolves the color image into main color images respectively of the extracted main colors (step S12).

Subsequently, points of the main colors on the three-dimensional space extracted at the step S2 are projected onto a plane by using the projection means A or the projection means B (step S13 or S14). In addition, distances between n points of the main colors (two combinations, three combinations, and n combinations) on the projection plane found at the step S13 or S14 are compared. If the distance is within a threshold range found by experiments beforehand, then the combination of the main colors is regarded as valid. If the distance is outside the threshold range, then the combination is regarded as invalid (step S15). As a result, an image area candidate combination is determined (steps S16 and S17). Subsequently, noise removal processing for removing portions other than the extraction target is conducted on the determined image area (step S18). Finally, the target subject is recognized by conducting figure recognition processing (step 19).

Effects of the third embodiment will now be described. In the present embodiment, it can be also coped with the case where the subject area is divided into a plurality of areas by using combinations of a plurality of patterns. As a result of combining a plurality of patterns, however, the processing time load is increased. Even under such a situation, however, it becomes possible to remove meaningless extra combinations when determining a combined image, and combine only effective areas such as character areas separated under the influence of the illumination condition or the coated surface thinned by deterioration or the like condition. As a result, it becomes possible to decrease the number of candidate areas. In the subsequent noise removal processing and recognition processing, therefore, it can be anticipated to increase the processing rate while maintaining the recognition precision.

INDUSTRIAL APPLICABILITY

The figure reading apparatus according to the present invention can be applied to recognition processing utilizing a color image, in which processing on combination of color components is needed, for example, under the influence of the illumination condition. Furthermore, the figure reading apparatus according to the present invention can also be applied to recognition of an object having a plurality of color areas.

The invention claimed is:

1. A figure reading apparatus for reading, recognizing and outputting a figure, the figure reading apparatus comprising:
    image input means for inputting a color image;
    main color extraction means for extracting main colors contained in the color image and resolving the color image into main color images respectively of the main colors extracted from the input color image;
    projection means for projecting points of extracted main colors on a three-dimensional space onto a plane by using a conversion expression;
    candidate narrowing down means for removing combinations that need not be combined according to features of distance between main colors projected onto a two-dimensional space; and
    combination generation means for combining images from candidates narrowed down and generating an image area candidate.

2. The figure reading apparatus according to claim 1, wherein the projection means projects points of extracted main colors on the three-dimensional space onto a plane of R+G+B=0 from a direction of (R, G, B)=(1, 1, 1) according to the following conversion expression by using a projection technique $$(x \ y \ z \ 1) = (x' \ y' \ z' \ 1) \begin{pmatrix} \cos(-\frac{\pi}{4}) & 0 & -\sin(-\frac{\pi}{4}) & 0 \\ 0 & 1 & 0 & 0 \\ \sin(-\frac{\pi}{4}) & 0 & \cos(-\frac{\pi}{4}) & 0 \\ 0 & 0 & 0 & 1 \end{pmatrix} \begin{pmatrix} 1 & 0 & 0 & 0 \\ 0 & \cos\theta_1 & \sin\theta_1 & 0 \\ 0 & -\sin\theta_1 & \cos\theta_1 & 0 \\ 0 & 0 & 0 & 1 \end{pmatrix}$$ [Equation 2]

$$\cos\theta_1 = \frac{\sqrt{2}}{\sqrt{3}}, \quad \sin\theta_1 = \frac{1}{\sqrt{3}}.$$

3. The figure reading apparatus according to claim 2, wherein
the candidate narrowing down means compares distances between points of main colors on the found projection plane,
if a distance is within a predetermined threshold range, then the candidate narrowing down means regards the combination of the main colors as valid, and
if a distance is outside the predetermined threshold range, then the candidate narrowing down means regards the combination of the main colors as invalid.

4. The figure reading apparatus according to claim 1, wherein the projection means finds a projection plane perpendicular to a change direction of color information other than a direction of (R, G, B)=(1, 1, 1) according to a feature of a light source, and projects points of extracted main colors onto the projection plane.

5. The figure reading apparatus according to claim 4, wherein
the candidate narrowing down means compares distances between points of main colors on the found projection plane,
if a distance is within a predetermined threshold range, then the candidate narrowing down means regards the combination of the main colors as valid, and
if a distance is outside the predetermined threshold range, then the candidate narrowing down means regards the combination of the main colors as invalid.

6. A figure reading method for reading, recognizing and outputting a figure, the figure reading method comprising:
an image input step of inputting a color image;
a main color extraction step of extracting main colors contained in the color image and resolving the color image into main color images respectively of the main colors extracted from the input color image;
a projection step of projecting points of extracted main colors on a three-dimensional space onto a plane by using a conversion expression;
a candidate narrowing down step of removing combinations that need not be combined according to features of distance between main colors projected onto a two-dimensional space; and
a combination generation step of combining images from candidates narrowed down and generating an image area candidate.

7. The figure reading method according to claim 6, wherein at the projection step, points of extracted main colors on the three-dimensional space are projected onto a plane of R+G+B=0 from a direction of (R, G, B)=(1, 1, 1) according to the following conversion expression by using a projection technique $$(x \ y \ z \ 1) = (x' \ y' \ z' \ 1) \begin{pmatrix} \cos(-\frac{\pi}{4}) & 0 & -\sin(-\frac{\pi}{4}) & 0 \\ 0 & 1 & 0 & 0 \\ \sin(-\frac{\pi}{4}) & 0 & \cos(-\frac{\pi}{4}) & 0 \\ 0 & 0 & 0 & 1 \end{pmatrix} \begin{pmatrix} 1 & 0 & 0 & 0 \\ 0 & \cos\theta_1 & \sin\theta_1 & 0 \\ 0 & -\sin\theta_1 & \cos\theta_1 & 0 \\ 0 & 0 & 0 & 1 \end{pmatrix}$$ [Equation 3]

$$\cos\theta_1 = \frac{\sqrt{2}}{\sqrt{3}}, \quad \sin\theta_1 = \frac{1}{\sqrt{3}}.$$

8. The figure reading method according to claim 7, wherein at the candidate narrowing down step,
distances between points of main colors on the found projection plane are compared,
if a distance is within a predetermined threshold range, then the combination of the main colors is regarded as valid, and
if a distance is outside the predetermined threshold range, then the combination of the main colors is regarded as invalid.

9. The figure reading method according to claim 6, wherein at the projection step, a projection plane perpendicular to a change direction of color information other than a direction of (R, G, B)=(1, 1, 1) is found according to a feature of a light source, and points of extracted main colors are projected onto the projection plane.

10. The figure reading method according to claim 9, wherein at the candidate narrowing down step,
distances between points of main colors on the found projection plane are compared,
if a distance is within a predetermined threshold range, then the combination of the main colors is regarded as valid, and
if a distance is outside the predetermined threshold range, then the combination of the main colors is regarded as invalid.

11. A figure reading program product embodied on a computer-readable medium and comprising codes that, when executed, cause a computer to perform a method for reading, recognizing and outputting a figure, the method comprising:
an image input step of inputting a color image;
a main color extraction step of extracting main colors contained in the color image and resolving the color image into main color images respectively of the main colors extracted from the input color image;
a projection step of projecting points of extracted main colors on a three-dimensional space onto a plane by using a conversion expression;
a candidate narrowing down step of removing combinations that need not be combined according to features of distance between main colors projected onto a two-dimensional space; and
a combination generation step of combining images from candidates narrowed down and generating an image area candidate.

* * * * *

UNITED STATES PATENT AND TRADEMARK OFFICE
CERTIFICATE OF CORRECTION

PATENT NO. : 7,664,318 B2  
APPLICATION NO. : 10/588076  
DATED : February 16, 2010  
INVENTOR(S) : Horiba et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Fourth Day of January, 2011

David J. Kappos  
*Director of the United States Patent and Trademark Office*